(12) United States Patent (10) Patent No.: US 8,949,147 B1
Chowdhury (45) Date of Patent: Feb. 3, 2015

(54) METHODS AND SYSTEMS FOR TRACKING A PRODUCT OR SERVICE WITHIN A SUPPLY

(75) Inventor: Ashfaque Chowdhury, Greensboro, NC (US)

(73) Assignee: New Breed, Inc., High Point, NC (US)

( * ) Notice: Subject to any disclaimer, the term of this patent is extended or adjusted under 35 U.S.C. 154(b) by 2269 days.

(21) Appl. No.: 10/150,626

(22) Filed: May 17, 2002

Related U.S. Application Data

(60) Provisional application No. 60/292,044, filed on May 18, 2001.

(51) Int. Cl.
*G06Q 10/00* (2012.01)
*G06F 7/00* (2006.01)

(52) U.S. Cl.
USPC .............. 705/28; 705/1.1; 707/705; 707/708; 707/711

(58) Field of Classification Search
USPC ............................................ 705/28; 700/115
See application file for complete search history.

(56) References Cited

U.S. PATENT DOCUMENTS

| | | | | |
|---|---|---|---|---|
| 4,992,940 A | * | 2/1991 | Dworkin | 705/26 |
| 5,490,088 A | | 2/1996 | Landis et al. | |
| 5,638,519 A | * | 6/1997 | Haluska | 705/28 |
| 5,781,773 A | * | 7/1998 | Vanderpool et al. | 707/100 |
| 6,032,145 A | * | 2/2000 | Beall et al. | 707/5 |
| 6,233,584 B1 | * | 5/2001 | Purcell | 707/103 X |
| 6,952,807 B1 | * | 10/2005 | Antosz | 715/810 |
| 2002/0138290 A1 | * | 9/2002 | Metcalfe et al. | 705/1 |
| 2002/0156770 A1 | * | 10/2002 | Krichilsky et al. | 707/3 |

OTHER PUBLICATIONS

Soukop, Ron and Delaney, Kalen, Inside Microsoft SQL Server 7.0, 1999, Microsoft Press, pp. 350-351.*
Soukop, Ron and Delaney, Kalen, Inside Microsoft SQL Server 7,0, 1999, Microsoft Press, see attached pps.*
Peterson, Andrew, "Building a Web-Based Search Tool," SQL Server Magazine (Sep. 1, 1999).
Peterson, Andrew, "Building a Web-Based Search Tool," SQL Server Magazine (Jul. 19, 2001).

* cited by examiner

*Primary Examiner* — Asfand Sheikh
(74) *Attorney, Agent, or Firm* — Kilpatrick Townsend & Stockton LLP

(57) ABSTRACT

Methods and systems for the efficient tracking of a product or service within the product or service's life cycle within a supply chain. Implementations of the present invention including at least one of a method, a process, a system, an apparatus, a computer-readable medium, and a data stream. The methods and systems of the present invention providing a user with the capability to track an item or order, shipment status, or to check an inventory quantity utilizing any one of a plurality of identification numbers. The methods and systems of the present invention also providing the user with the capability to track an item or order, shipment status, or to check an inventory quantity utilizing a partial identification number. The methods and systems of the present invention further providing for secure access via a globally-distributed computer network, such as the Internet. A graphical user interface is provided that is intuitive and user friendly.

18 Claims, 14 Drawing Sheets

METHODS AND SYSTEMS FOR TRACKING A PRODUCT OR SERVICE WITHIN A SUPPLY

CROSS-REFERENCE TO RELATED APPLICATIONS

This non-provisional patent application claims the benefit of U.S. Provisional Patent Application No. 60/292,044, entitled "Smart Trace Method and System," filed May 18, 2001, which is incorporated herein in full by reference.

NOTICE OF COPYRIGHT PROTECTION

A portion of the disclosure of this patent application contains material that is subject to copyright protection. The copyright owner has no objection to the facsimile reproduction by anyone of the disclosure or the patent application as it appears in the files and/or records of the United States Patent and Trademark Office, but otherwise reserves all rights afforded by this copyright protection.

FIELD OF THE INVENTION

The present invention relates generally to the fields of inventory control and management. More specifically, the present invention relates to methods and systems for tracking a product or service within the product or service's life cycle within a supply chain.

BACKGROUND OF THE INVENTION

Typically, an item or order within a supply chain is associated with a plurality of identification numbers. Utilizing conventional methods and systems for tracking the item or order, a user is required to know the specific identification number associated with the item or order. Because these identification numbers are typically rather lengthy, it is relatively simple for the user to make a mistake in either remembering the identification number or in entering the identification number into the system to query the status of the item or order associated with the identification number.

Additionally, these identification numbers are typically specific to the system being queried. For example, when a user queries a carrier for the status of a given order, the user typically interfaces with the carrier's system and inputs a carrier order identification number. However, the item associated with the order may still be located in a warehouse, in which case the order may not yet be docketed by the carrier or appear in the carrier's system. Utilizing conventional tracking methods and systems, the user must interface with the warehouse system and query the status of the order using a warehouse order identification number. Thus, the user not only has to log into multiple systems, but also has to remember multiple identification numbers.

Conventional systems that target the travel industry include, for example, SideStep, Travelocity, and Expedia. SideStep provides one interface to a plurality of airlines for ticketing information and sales. Travelocity and Expedia provide one interface to a plurality of airlines, hotels, and automobile rental agencies for ticketing information and sales. These conventional systems, however, provide limited capability to query a plurality of databases and return query results to a user. These conventional systems, and those utilized by the United States Postal Service, Federal Express (FedEx), United Parcel Service (UPS), Airborne Express, DHL, and others, do not provide effective capability for tracking or searching based upon partial identification number entries.

Thus, what is needed are methods and systems for tracking an item or order within the item or order's life cycle within a supply chain that avoids the disadvantages of the conventional methods and systems, while offering additional advantages.

BRIEF SUMMARY OF THE INVENTION

Embodiments of the present invention provide methods and systems for the efficient tracking of a product or service within the product or service's life cycle within a supply chain. Specific implementations of the present invention include a method, a process, a system, an apparatus, a computer-readable medium, and a data stream.

Embodiments of the present invention provide for the consolidation of supply chain information. As a result, a user needs to utilize only one interface to track an item or order within a supply chain. Advantageously, this feature provides a substantial savings in resources. For example, the user (e.g., a manager, an employee, or an operator) saves time tracking the status of a given order because he or she may utilize one interface for order tracking and item quantity determinations, rather than a plurality of interfaces for each order life cycle milestone. Life cycle milestones include: order entry or placement, approval, allocation, planning, release to a warehouse, picking at the warehouse, packing at the warehouse, shipping from the warehouse, delivery, and closing. Life cycle milestones may be tailored to a specific customer and/or order type. For example, rush orders may not require approval. Additionally, providing one interface for accessing tracking information and consolidating this tracking information is that fewer managers, employees, or operators need to be dedicated to the task of tracking orders, thereby allowing them to perform other tasks.

Embodiments of the present invention provide a plurality of optional implementations of the user interface. These implementations include, but are not limited to, a web page, a web page/thick client using Java applets, and a thick application based upon C++ or Visual Basic.

Embodiments of the present invention provide a user with the capability to track an item or order, shipment status, or to check an inventory quantity utilizing any one of a plurality of identification numbers. These identification numbers include, for example, a customer identification number, a warehouse identification number, and a company identification number.

Embodiments of the present invention also provide the user with the capability to track an item or order, shipment status, or to check an inventory quantity utilizing a partial identification number. Typically, the user does not know the complete order identification number or is unsure of the format of the order identification number (e.g., the number of zeroes that precede the order identification number or the spacing of the order identification number). Embodiments of the present invention provide a character-based search that utilizes pattern matching techniques to find information in a search category based on a reference number or part of a reference number entered by the user. Search categories include, for example: item availability, company identification number, warehouse identification number, customer reference number, carrier tracking number, customer order, item order, and serial number.

Advantageously, these identification numbers may be structured such that a customer's name appears in the identification numbers (e.g., "ACMEXXXX" for ACME Co. identification numbers, where "XXXX" represents four (4) digits). Thus, if the user knows that a specific order is for ACME Co. but does not know the exact order identification number, the user can search on "ACME" and query the status of all ACME Co. orders. It is important to note that these orders are stored in a plurality of data repositories, including application service provider ("ASP")-hosted databases and flat files, which embodiments of the present invention consolidate into a local data repository.

Embodiments of the present invention provide for secure access via a globally-distributed computer network, such as the Internet. The user, upon entry of correct login information and a password, may access the systems of the present invention from any computing device via the Internet. A graphical user interface ("GUI") is provided that is intuitive and user friendly. Thus, users of the systems of the present invention require little training to become proficient.

In one embodiment of the present invention, a method for tracking a product or service within the product or service's life cycle within a supply chain includes receiving an identification number, receiving a searchable category, and receiving a data table associated with the searchable category. The method also includes consolidating the data table associated with the searchable category into a consolidated data table associated with the searchable category and searching the consolidated data table associated with the searchable category for the identification number.

In another embodiment of the present invention, a system for tracking a product or service within the product or service's life cycle within a supply chain includes a server operable for receiving an identification number and a searchable category and a roll-up data storage device operable for receiving a data table associated with the searchable category. The system also includes means for consolidating the data table associated with the searchable category into a consolidated data table associated with the searchable category and means for searching the consolidated data table associated with the searchable category for the identification number.

Additional objects, novel features, and advantages of the present invention will be set forth in greater detail in the description that follows. Additional objects, novel features, and advantages of the present invention will also be apparent to those of ordinary skill in the art upon examination of the description that follows and upon the practice of the present invention.

DETAILED DESCRIPTION OF THE INVENTION

In various embodiments, the present invention provides methods and systems for the efficient tracking of an item or order within the item or order's life cycle within a supply chain. An item or order tracking mechanism is implemented, allowing a user to perform query operations based upon the input of partial identification numbers.

In the description that follows, numerous specific details are set forth in order to provide a thorough understanding of the present invention. It will be obvious, however, to one of ordinary skill in the art, that the methods and systems of the present invention may be practiced without the inclusion of some or all of these specific details. In other instances, familiar process operations have not been described in detail in order to avoid obscuring the novel features of the invention.

Figure 1:
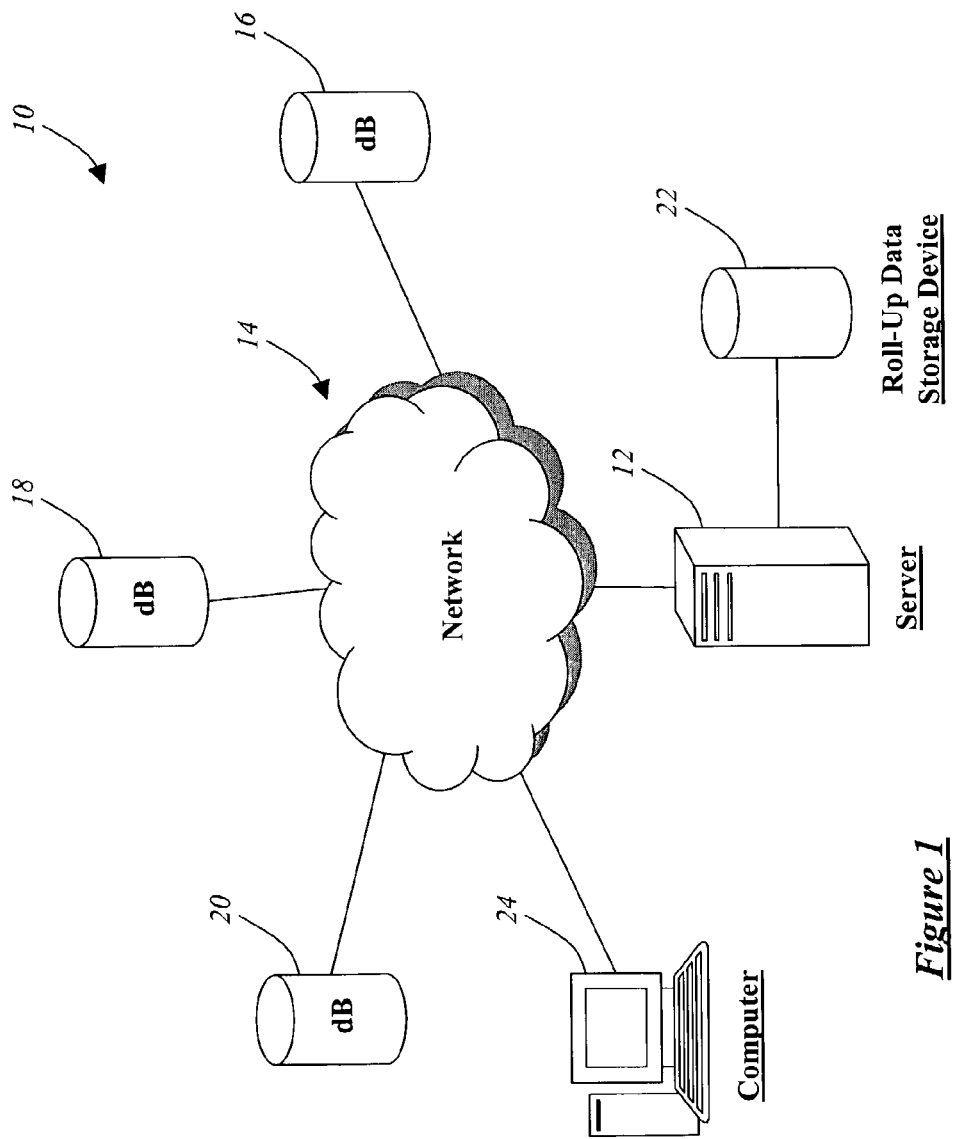
FIG. 1 is a schematic diagram of one embodiment of a system for tracking a product or service within a supply chain in a networked environment.

FIG. 1 illustrates one embodiment of a system 10 for tracking a product or service within a supply chain in a networked environment. A server 12 interfaces with a network 14 to gather/collect information from a plurality of remotely located data repositories 16, 18, 20. In an alternative embodiment, the server 12 and at least one of the plurality of data repositories 16, 18, 20 are co-located. The functions of the server 12 may be distributed such that a plurality of servers 10 exist in communication with each other via the network 14. Preferably, the network 14 includes various network technologies, such as a local-area network ("LAN") and/or a wide-area network ("WAN"). The LAN may include, for example, an Ethernet, a fiber-distributed data interface ("FDDI") LAN, an asynchronous transfer mode ("ATM") LAN, and/or a virtual LAN ("VLAN"). The WAN may include, for example, a globally-distributed computer network, such as the Internet, and/or the plain old telephone system ("POTS").

The server 12 queries the plurality of data repositories 16, 18, 20 for information related to a product, a service, an item, or an order (or any combination thereof) and consolidates this information in records retained in a roll-up data storage device 22, which may also be the local server 12. The plurality of data repositories 16, 18, 20 include application service provider ("ASP")-hosted databases, flat files, or other storage devices/mechanisms. The roll-up data storage device 22 includes a database, a flat file, or another storage device/mechanism. The roll-up data storage device 22 stores consolidated item and/or order status information resulting from queries by the server 12 on the plurality of data repositories 16, 18, 20 and a subsequent merging of item and/or order status record fields obtained from the query responses.

In an exemplary embodiment of the system 10 for tracking a product or service within a supply chain, the plurality of data repositories 16, 18, 20 include a client database 16, a warehouse database 18, and a carrier tracking remote database 20. Each of the plurality of data repositories 16, 18, 20 is in communication with the others, allowing the plurality of data repositories 16, 18, 20 to share information. The client database 16 is operable for storing client order information. The warehouse database 18 is operable for storing warehouse information related to orders. The carrier tracking remote database 20 is operable for storing carrier shipment and delivery information. The client order information, warehouse information related to orders, and carrier shipment and delivery information may include, for example, an order identification number, a company order number, a warehouse order number, a client reference, customer order information (including customer identification information, customer location information, and order priority information), warehousing information (including an item description and warehouse identification information), carrier tracking information (including order status information and estimated time of arrival information), item availability information (including quantity available information and backlog information), and item order information. In an alternative embodiment, a plurality of any one of the types of data repositories 16, 18, 20 may be utilized. Additionally, any one of the types of data repositories 16, 18, 20 may be an ASP-hosted database.

A user accesses item or order information utilizing a computer 24 that interfaces with the server 12 via the network 14. The user may be, for example, a customer, a client, a provider, an individual associated with a warehouse, or an individual associated with a carrier. In alternative embodiments, the computer 24 is a personal computer ("PC"), a workstation, a laptop computer, a thick client, a thin client, or any other such computing or display device capable of interfacing with the server 12 via the network 14 or another communications path. In a preferred embodiment, multiple-user computers 24 are utilized to track items or orders.

The user accesses consolidated item or order information, client order information, warehouse information related to orders, and carrier shipment and delivery information stored in the plurality of data repositories 16, 18, 20, retained in the roll-up data storage device 22 by issuing one or more queries to the server 12 preferably via the Internet. In one embodiment, the user clicks on links of a web page to issue queries via the network 14, the queries corresponding to specific categories of items or orders.

The user views consolidated item or order information on GUI screens displayed by the computer 24. The server 12 rolls up or gathers/collects item and order information from the plurality of data repositories 16, 18, 20 and consolidates the item or order information in the roll-up data storage device 22. In one embodiment, the server 12 initiates a roll-up query mechanism by issuing at least one of push and pull structured query language ("SQL") queries to the plurality of data repositories 16, 18, 20.

In a preferred embodiment, the roll-up data storage device 22 includes a database. Roll-up item or order information includes reference identification numbers ("IDs") that link back to the item or order information stored in the data repositories 16, 18, 20. For example, a warehouse ID appears in a composite or consolidated record in the roll-up data storage device 22. This warehouse ID also corresponds to a record in the warehouse database 18. Likewise, the client ID, the carrier ID, and the associated item or order information are reflected in records stored in the client database 16 and the carrier tracking remote database 20, respectively, and in at least one composite or consolidated record in at least one table in the roll-up data storage device 22. The server 12 then assigns a customer order number ("ID") to the composite or consolidated record, tying the client, the warehouse, and the carrier item or order information together. Any field redundancies within a single record resulting from the server 12 merging records from the client database 16, the warehouse database 18, and the carrier tracking remote database 20 are removed before the composite or consolidated record is stored in the roll-up data storage device 22.

Figure 2:
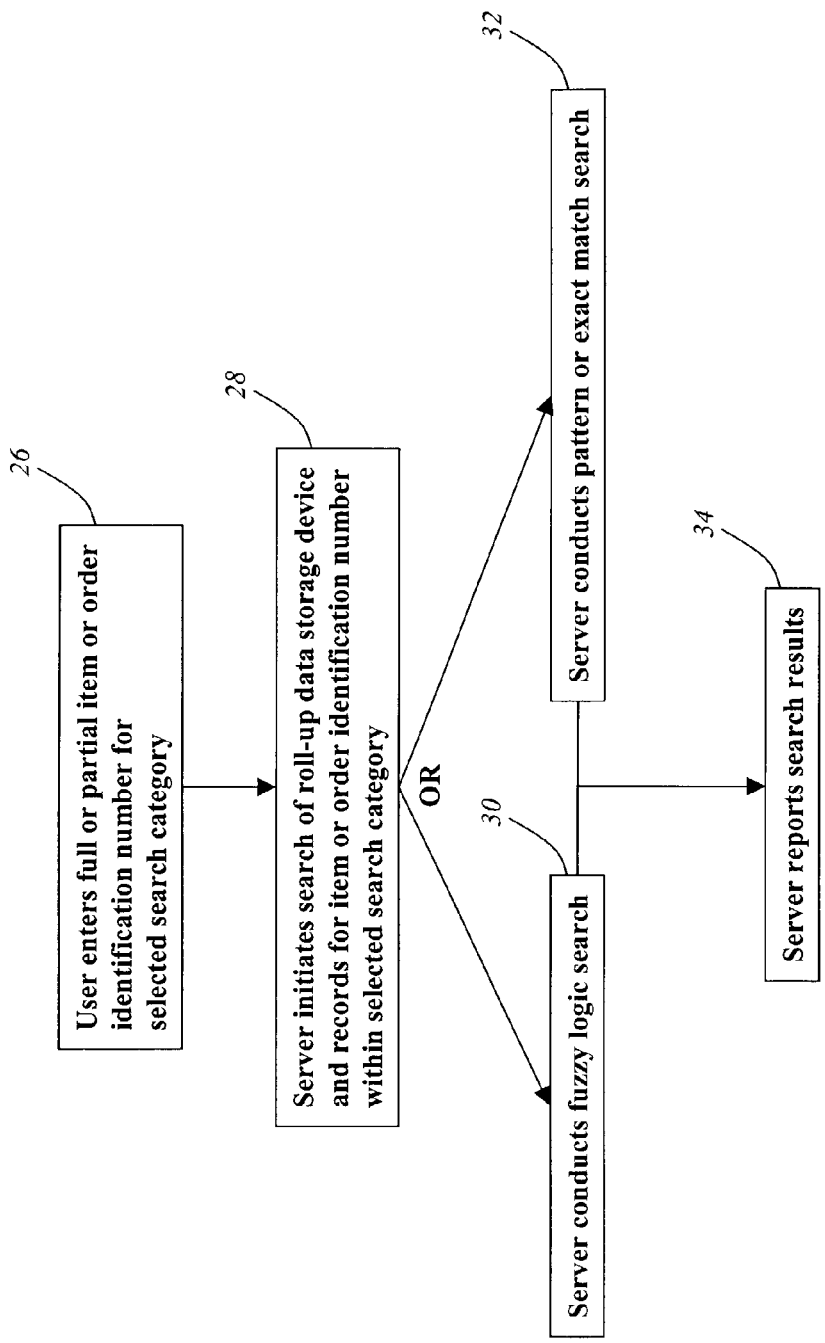
FIG. 2 is a flow chart of one embodiment of a method for tracking a product or service within a supply chain in a networked environment.

This method or process may be further appreciated by reviewing the GUI that is presented to a user. Referring to FIG. 2, in an embodiment of the present invention, a user enters a full or partial item or order identification number for a selected search category (Block 26). The server 12 then initiates a search of the roll-up data storage device 22 and the associated records for the corresponding identification number within the selected search category (Block 28). The search category corresponds to a field within a record, such as a company order identification number field. In one embodiment, the server 12 conducts a fuzzy logic-based database search for the identification number (Block 30), which is represented as a string of alphanumerics. Fuzzy logic-based database searching is a technique that enables partial identification number searches. With fuzzy logic-based searching, the server 12 performs a database query in which a matching result occurs when a partial string is found anywhere within a full string. Thus, for example, if the user enters "123" for search category "Warehouse Order No.", then any record having a warehouse order identification number that contains "123" anywhere within the full warehouse order identification number (e.g., at the beginning, in the middle, or at the end) will be included in the returned results. Fuzzy logic uses SQL queries to identify a reference or query string within a search category field string by "wildcarding" the beginning and the end of the query string. For example, when applying a fuzzy logic search for "%123%" against a given search category, where "%" represents a wildcard character, all records in which "123" appears anywhere within the search category field string (such as "ACME12372") will be returned in the query result.

Alternative embodiments implement pattern or exact match techniques to search for a given identification number, which is represented as a string of alphanumerics. Pattern match searching is a subset of fuzzy logic-based searching wherein a wildcard character is removed from either the front or back of a query string (e.g., "123%" or "%123"). Thus, a match occurs at the beginning or end, respectively, of the search category field string. The exact match or exact search method requires that the query string exactly match the search category field string.

Figure 3:
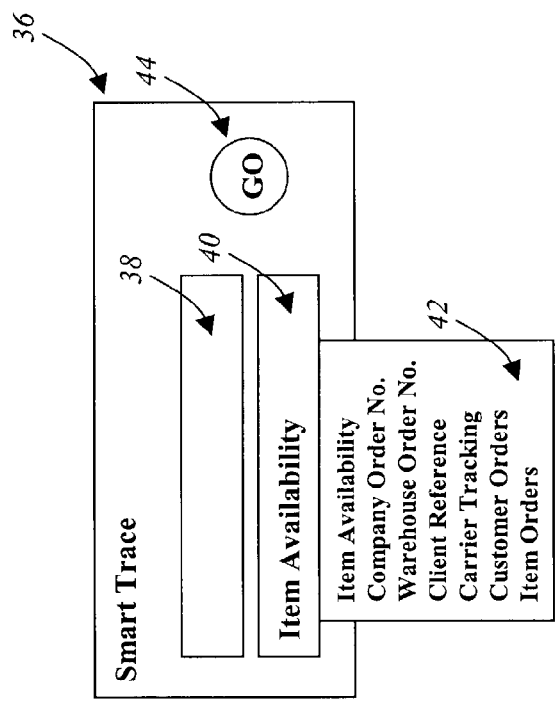
FIG. 3 is a representation of one embodiment of a graphical user interface ("GUI") including a Smart Trace window.

Referring to FIG. 3, a GUI is shown including a "Smart Trace" window 36. The Smart Trace window 36 includes a text field 38 for user entry of an identification number, and a search category selection pull-down 40. A user enters a full or partial identification number in the text field 38 and selects one of the searchable categories 42, including: Item Availability, Company Order Number, Warehouse Order Number, Client Reference Number, Carrier Tracking Number, Carrier Tracking Status, Customer Orders, and Item Orders. Next, the user clicks the "Go" button 44 to initiate a search for records within the searchable category 42 containing the full or partial order identification number.

In one embodiment, the server 12 performs a search of the searchable category 42 selected in the pull-down menu 40 for a full or partial identification number entered in the text field 38 using fuzzy logic. Alternative embodiments utilize pattern matching and exact matching techniques.

Figure 4:
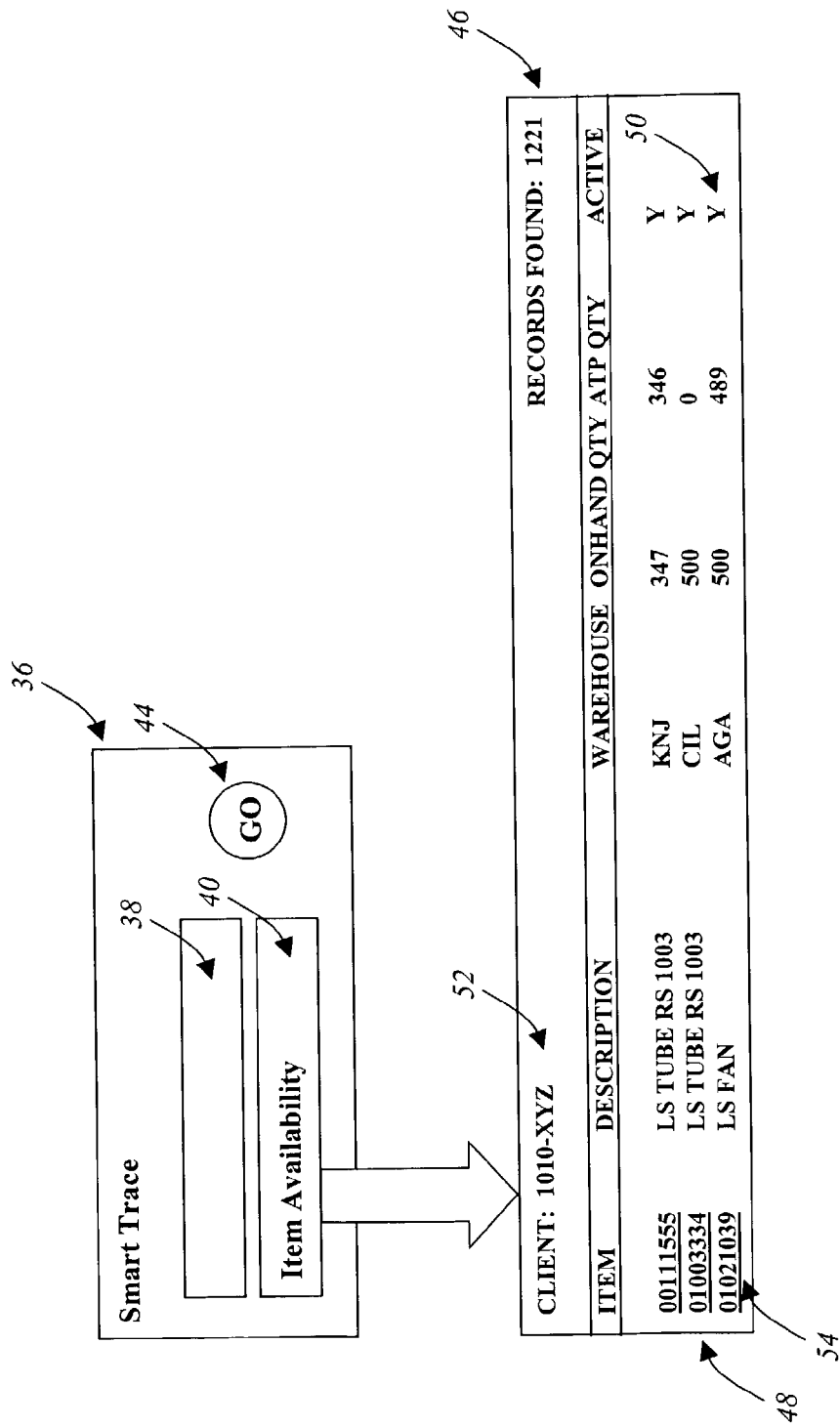
FIG. 4 is a representation of another embodiment of a GUI, illustrating a Smart Trace search based on an Item Availability category.

Referring to FIG. 4, a user enters a partial identification number of "01" in the text field 38 of the Smart Trace window 36, chooses the "Item Availability" search category from the selection pull-down 40, and clicks the "Go" button 44. The "Item Availability" window 46 appears with a results listing in a records table 48. Each individual record 50 includes fields for an item identification, a description, a warehouse trigraph, quantities, and an active status. The client and number of records found appear in the header 52 of the Item Availability window 46. A link 54 to more detailed information regarding the item is also provided. The purpose of the Item Availability category is to provide the user with information as to an item's availability within the supply chain.

Figure 5:
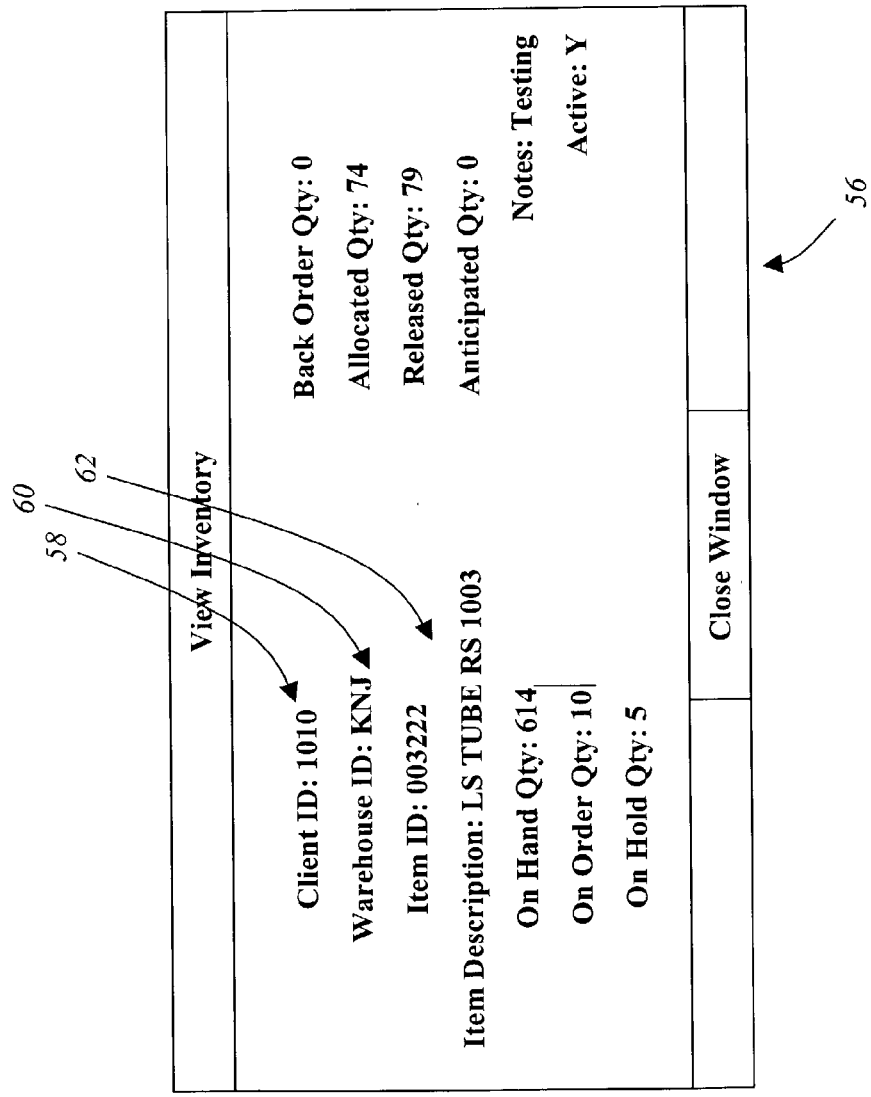
FIG. 5 is a representation of a further embodiment of a GUI including a View Inventory screen.

By clicking on link 54 in the Item Availability window 46 for item "01003334" located in warehouse "KNJ," the user may drill down to more detailed information regarding the particular item, as illustrated in FIG. 5. FIG. 5 illustrates a "View Inventory" window 56 for the selection of the link 54 (item "01003334"/warehouse "KNJ") of FIG. 4. Among the information carried over from FIG. 4 are the client ID field 58, the warehouse ID field 60, and the item ID field 62. Additional information includes a plurality of fields associated with quantity categories such as the back order quantity field and the allocated quantity field.

Figure 6:
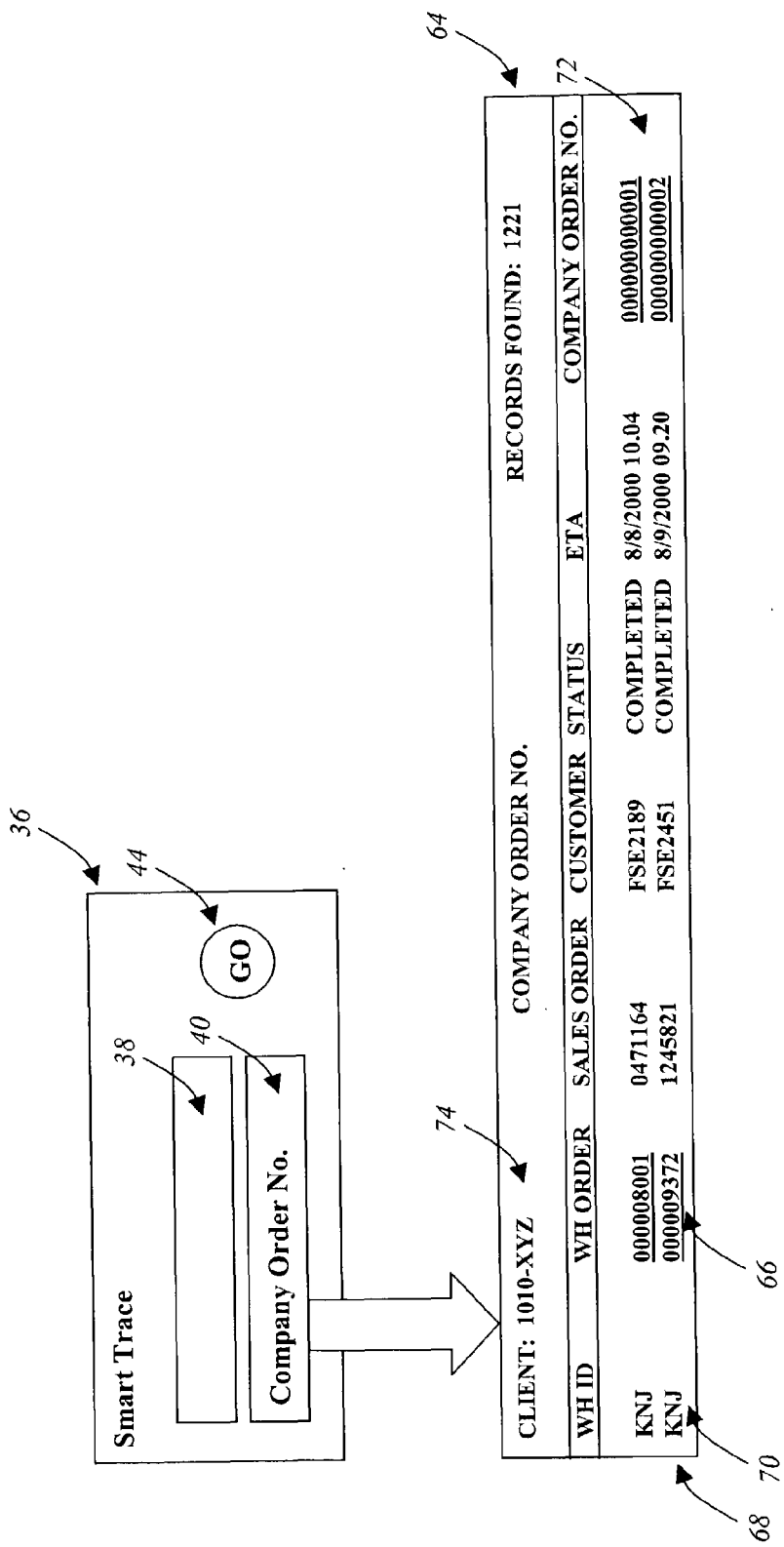
FIG. 6 is a representation of a further embodiment of a GUI, illustrating a Smart Trace search based on a Company Order Number category.

Referring to FIG. 6, a user enters a partial identification number of "0" in the text field 38 of the Smart Trace window 36, chooses the "Company Order No." search category in the selection pull-down 40, and clicks the "Go" button 44. A "Company Order No." window 64 appears with a results listing in a records table 68. Each individual record 70 includes fields for a warehouse ID, a warehouse order number, a sales order, a notification number, a customer ID, location, status, an estimated time of arrival ("ETA"), and a company order number. The client ID, the number of records found, and the search category appear in the header 74 of the Company Order No. window 64. A company order link 72 and a warehouse order link 66 are provided for the user to access more detailed information regarding a given sales order and the warehouse order, respectively. The Company Order No. is also the sales order number.

The user clicks on the company order link 72 illustrated in FIG. 6 to access more detailed information about the sales order (i.e., the company order identification number). The "Order View" window 76 of FIG. 7 appears including a detailed sales order section 80, an order line item section 82, and a warehouse information section 84. Within the warehouse information section 84 is a Warehouse Order ID link 86, which provides the user with access to further details regarding the warehouse order. The title bar 78 includes an "Order View" screen title and a Company Order No.

The user clicks on the Warehouse Order ID link 86 illustrated in FIG. 6 to access more detailed information regarding the warehouse order. An "Order Plan Detail View" screen 88, illustrated in FIG. 8, appears including a title bar 90, a detailed order plan section 94, a transportation plan section 96, and an order tracking section 98. The Warehouse Order No. and the Order ID 92 (which corresponds to the Company Order No., as shown in the title bar 78 of FIG. 7) appear in the detailed order plan section 94.

Figure 9:
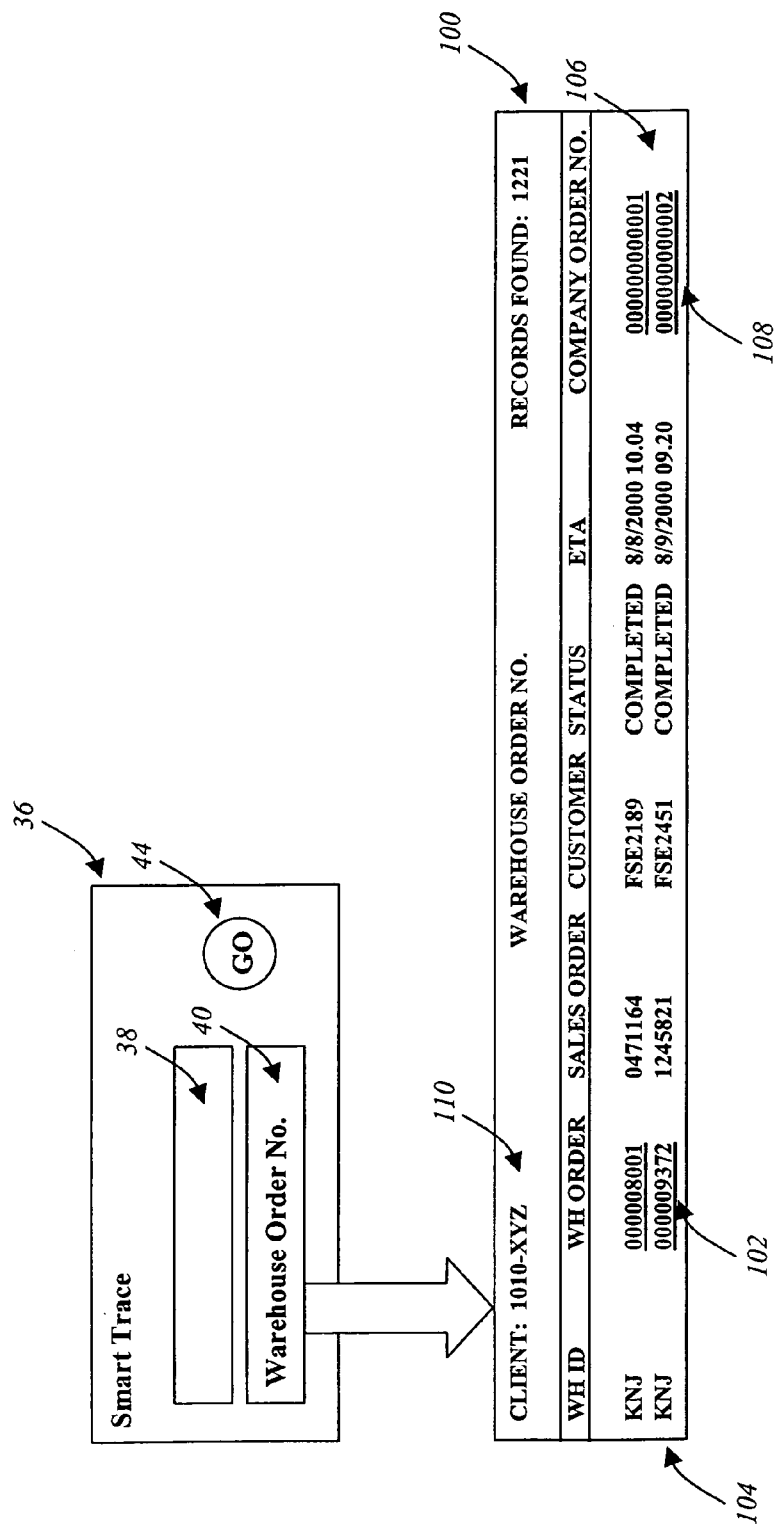
FIG. 9 is a representation of a further embodiment of a GUI, illustrating a Smart Trace search based on a Warehouse Order Number category.

Referring to FIG. 9, the user enters a partial identification number of "09" in the text field 38 of the Smart Trace window 36, chooses the "Warehouse Order No." search category in the selection pull-down 40, and clicks the "Go" button 44. A "Warehouse Orders" window 100 appears with results listed in a records table 104. Each individual record 106 includes a warehouse ID, a warehouse order number, a sales order number, a notification number, a customer ID, location, status, an ETA, and a company order field. The client name, number of records found, and search category appear in the header 110 of the Warehouse Orders window 100. A Company Order link 108 and a Warehouse Order link 102 are provided for the user to access more detailed information regarding the sales order and the warehouse order, respectively. The Company Order No. refers to a sales order.

Figure 10:
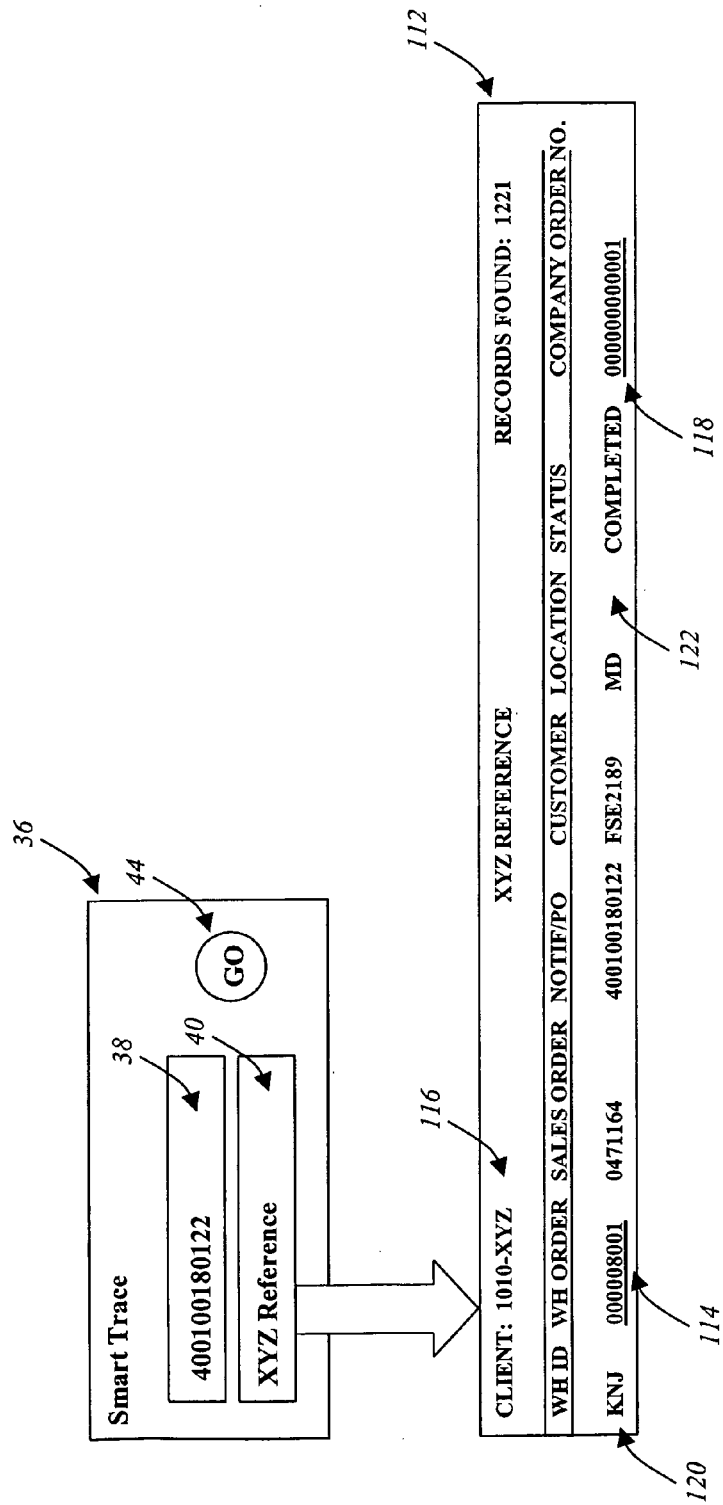
FIG. 10 is a representation of a further embodiment of a GUI, illustrating a Smart Trace search based on a Client Order Number category.

Referring to FIG. 10, the user enters an entire Client Reference No. (or, optionally, a partial reference number) in the text field 38 of the Smart Trace window 36, chooses the "Client Reference" search category in the selection pull-down 40, and clicks the "Go" button 44. It is important to note that, in this example, the client's name is "XYZ." A "Client Order Number" window 112 appears with the result listed in a records table 120. Each individual record 122 includes a warehouse ID, a warehouse order number, a sales order, a notification number, a customer ID, location, status, an ETA, and a Company Order No. field. The client name, client number, and number of records found appear in the header 116 of the Client Reference Number window 112. A Company Order link 118 and a Warehouse Order link 114 are provided for the user to access more detailed information regarding a sales order and a warehouse order, respectively. The Company Order No. refers to a sales order.

Figure 11:
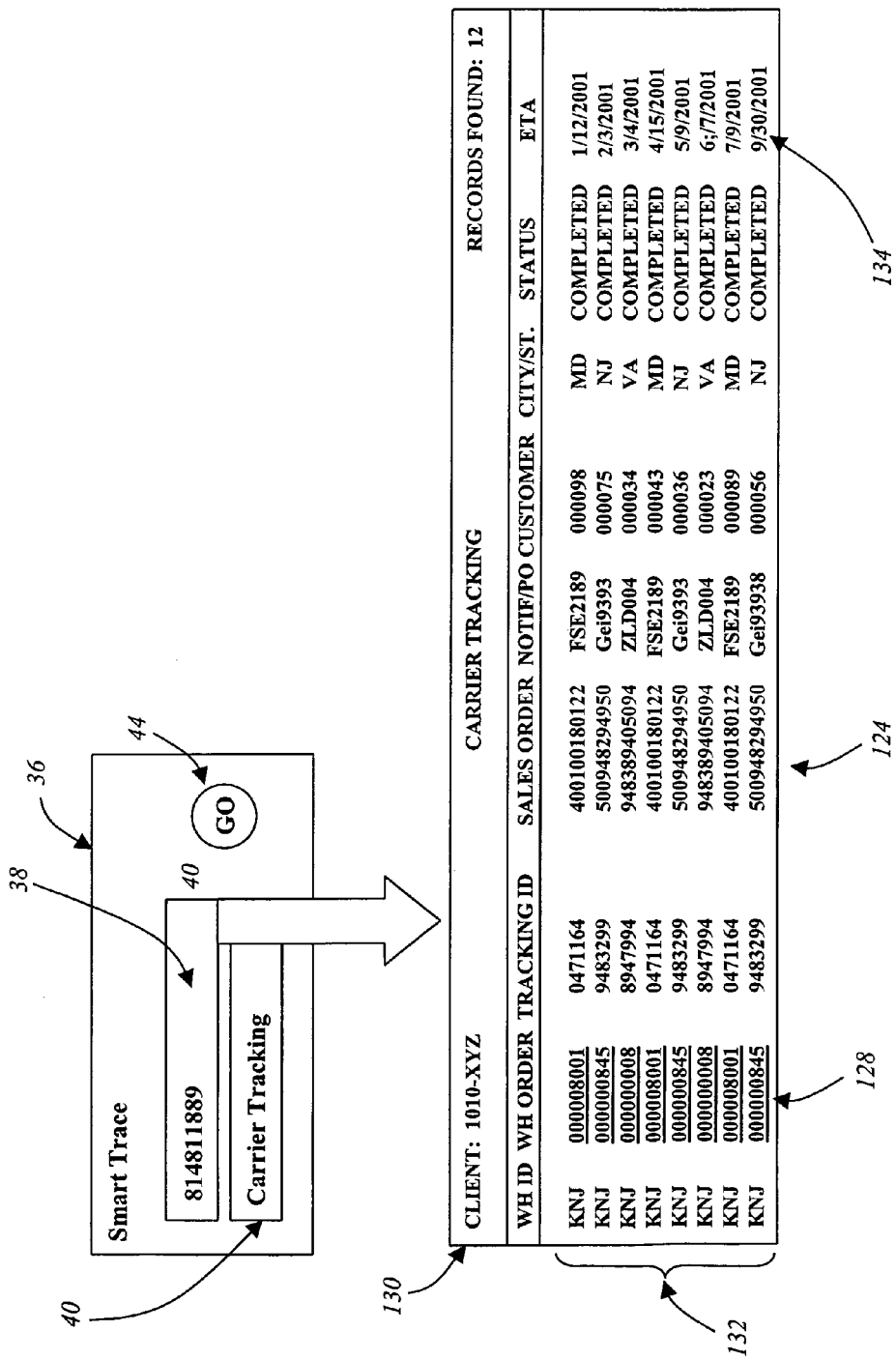
FIG. 11 is a representation of a further embodiment of a GUI, illustrating a Smart Trace search based on a Carrier Tracking Number category.

Referring to FIG. 11, the user enters a partial Carrier Tracking No. in the text field 38 of the Smart Trace window 36, chooses the "Carrier Tracking" search category in the selection pull-down 40, and clicks the "Go" button 44. A "Carrier Tracking Number" window 124 appears with the results listed in a records table 132. Each individual record 134 includes a warehouse ID, a warehouse order number, a tracking ID, a sales order, a notification number, a customer ID, location, status, and an ETA field. The client name, number of records found, and search category appear in the header 130 of the Carrier Tracking No. window 124. A Warehouse Order link 128 is provided for the user to access more detailed information regarding the warehouse order.

Figure 7:
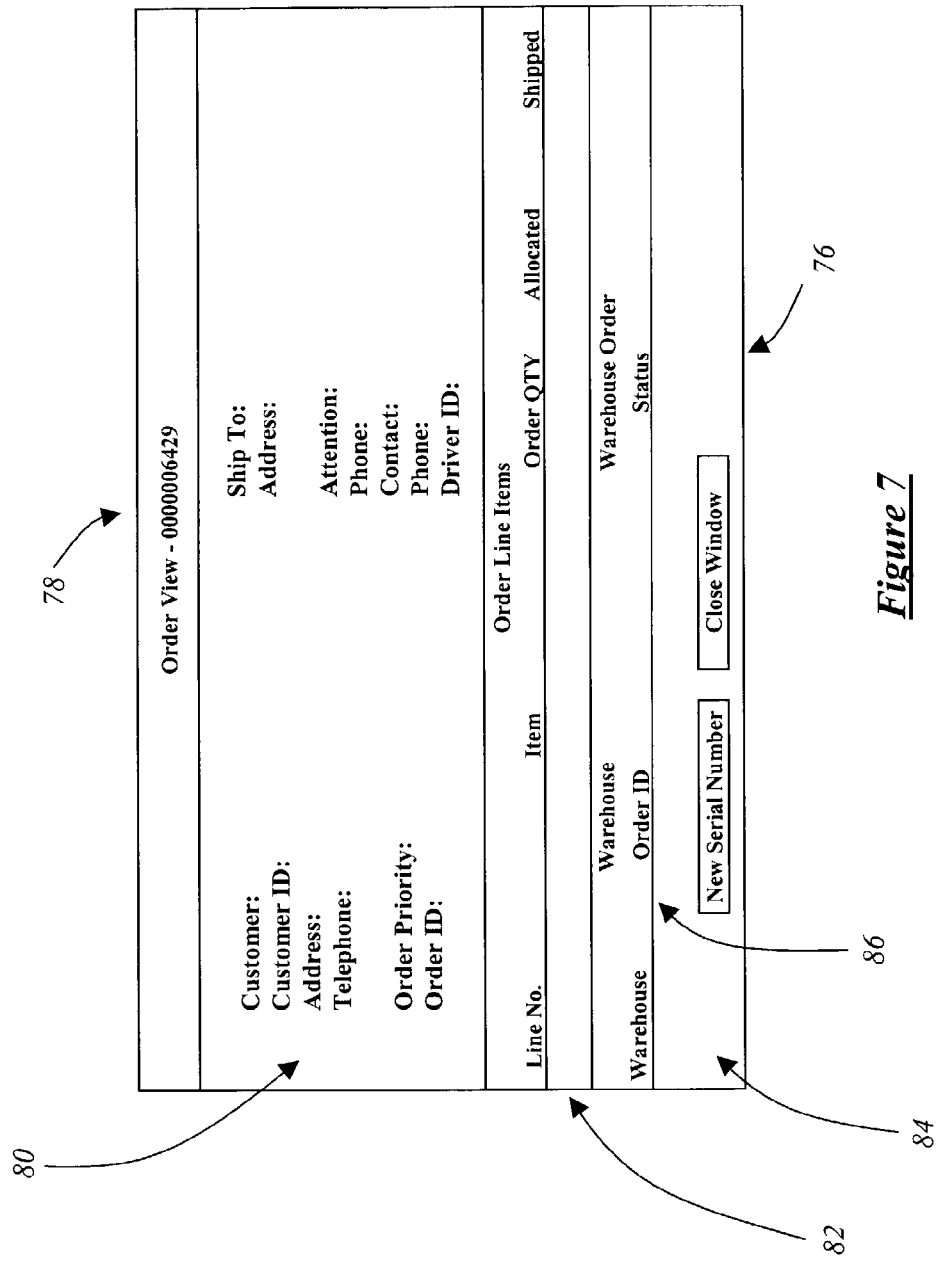
FIG. 7 is a representation of a further embodiment of a GUI including an Order View screen.
Figure 8:
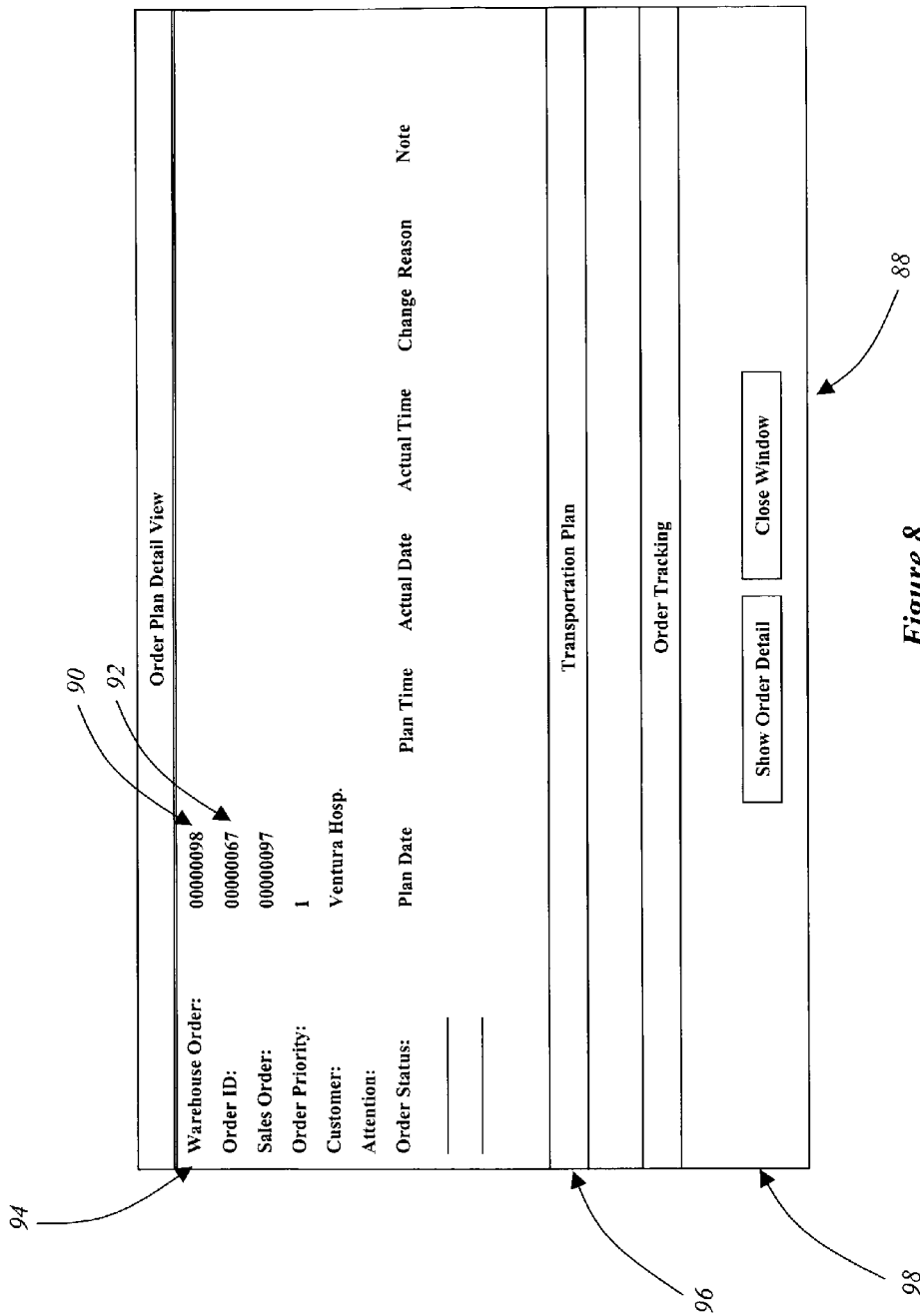
FIG. 8 is a representation of a further embodiment of a GUI including an Order Plan Detail View screen.
Figure 12:
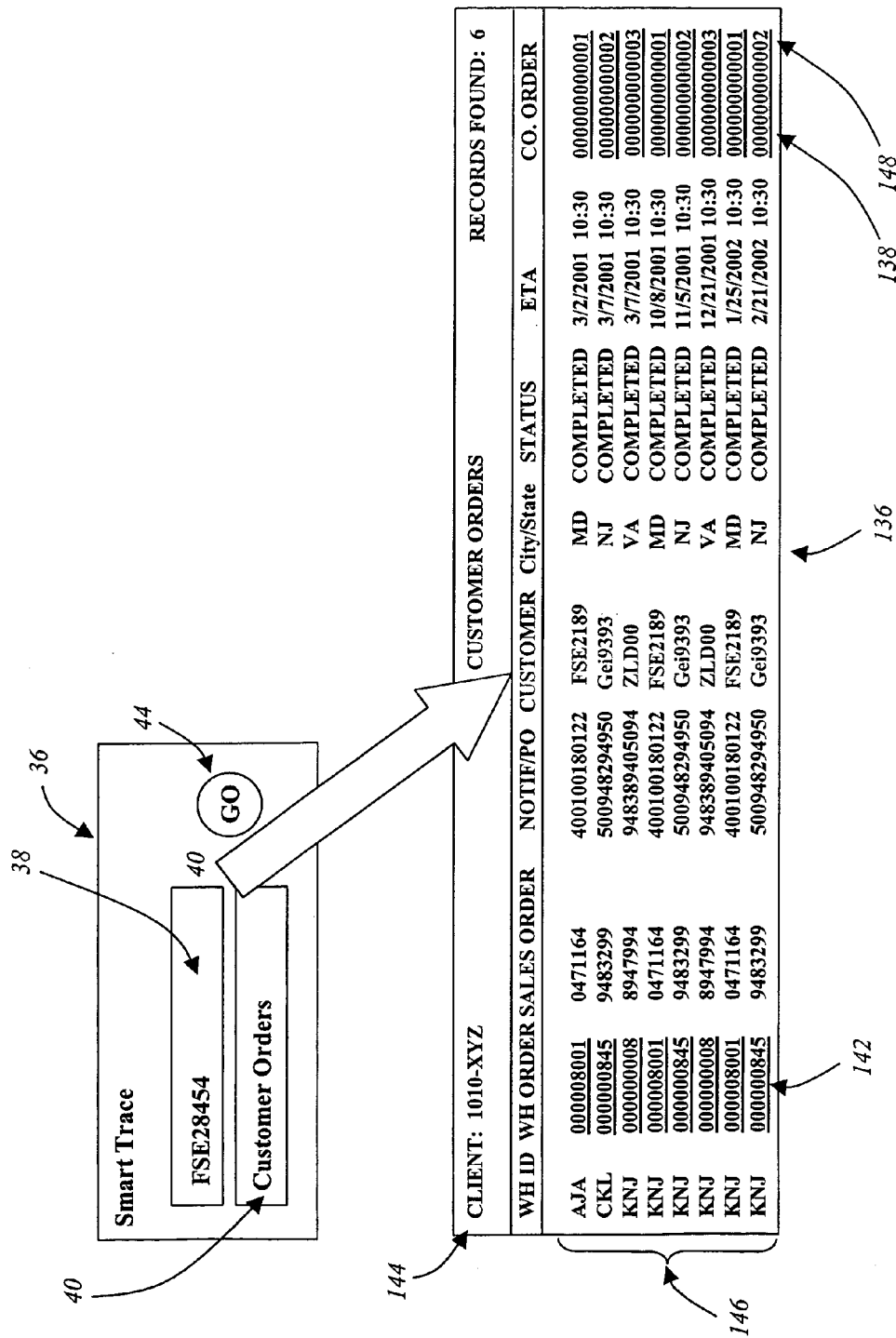
FIG. 12 is a representation of a further embodiment of a GUI, illustrating a Smart Trace search based on a Customer Orders category.

Referring to FIG. 12, the user enters an entire Customer ID No. (or, optionally, a partial Customer ID No.) in the text field 38 of the Smart Trace window 36, chooses the "Customer Orders" search category in the selection pull-down 40, and clicks the "Go" button 44. A "Customer Orders Number" window 136 appears with the results listed in a records table 146. Each individual record 148 includes a warehouse ID, a warehouse order number, a sales order, a notification number, a customer ID, location, status, an ETA, and a Company Order No. field. The client name, number of records found, and search category appear in the header 144 of the Client Reference No. window 136. A Company Order link 138 and a Warehouse Order link 142 are provided for the user to access more detailed information regarding the sales order (presented in an Order View screen, as illustrated in FIG. 7) and the warehouse order, respectively. The Company Order No. refers to a sales order.

Figure 13:
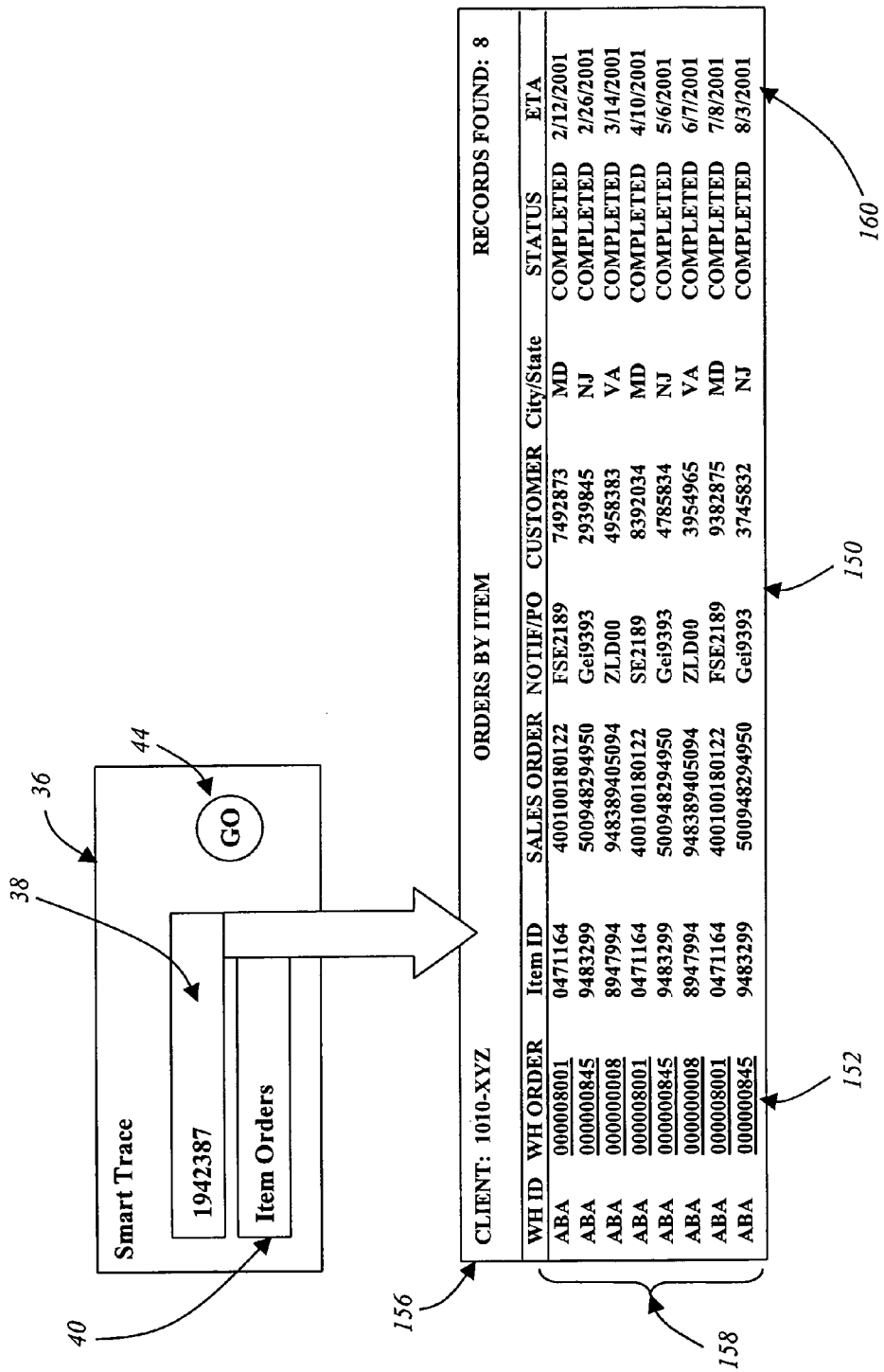
FIG. 13 is a representation of a further embodiment of a GUI, illustrating a Smart Trace search based on an Item Orders category.

Referring to FIG. 13, the user enters an entire Item ID Number (or, optionally, a partial Item ID Number) in the text field 38 of the Smart Trace window 36, chooses the "Item Orders" search category in the selection pull-down 40, and clicks the "Go" button 44. An "Items Order No." window 150 appears with the results listed in a records table 158. Each individual record 160 includes a warehouse ID, a warehouse order number, an item ID number, a sales order, a notification number, a customer ID, location, status, and an ETA field. The client name, number of records found, and search category appear in the header 156 of the Item Orders Number window 150. A Warehouse Order link 152 is provided for the user to access more detailed information regarding a warehouse order.

Figure 14:
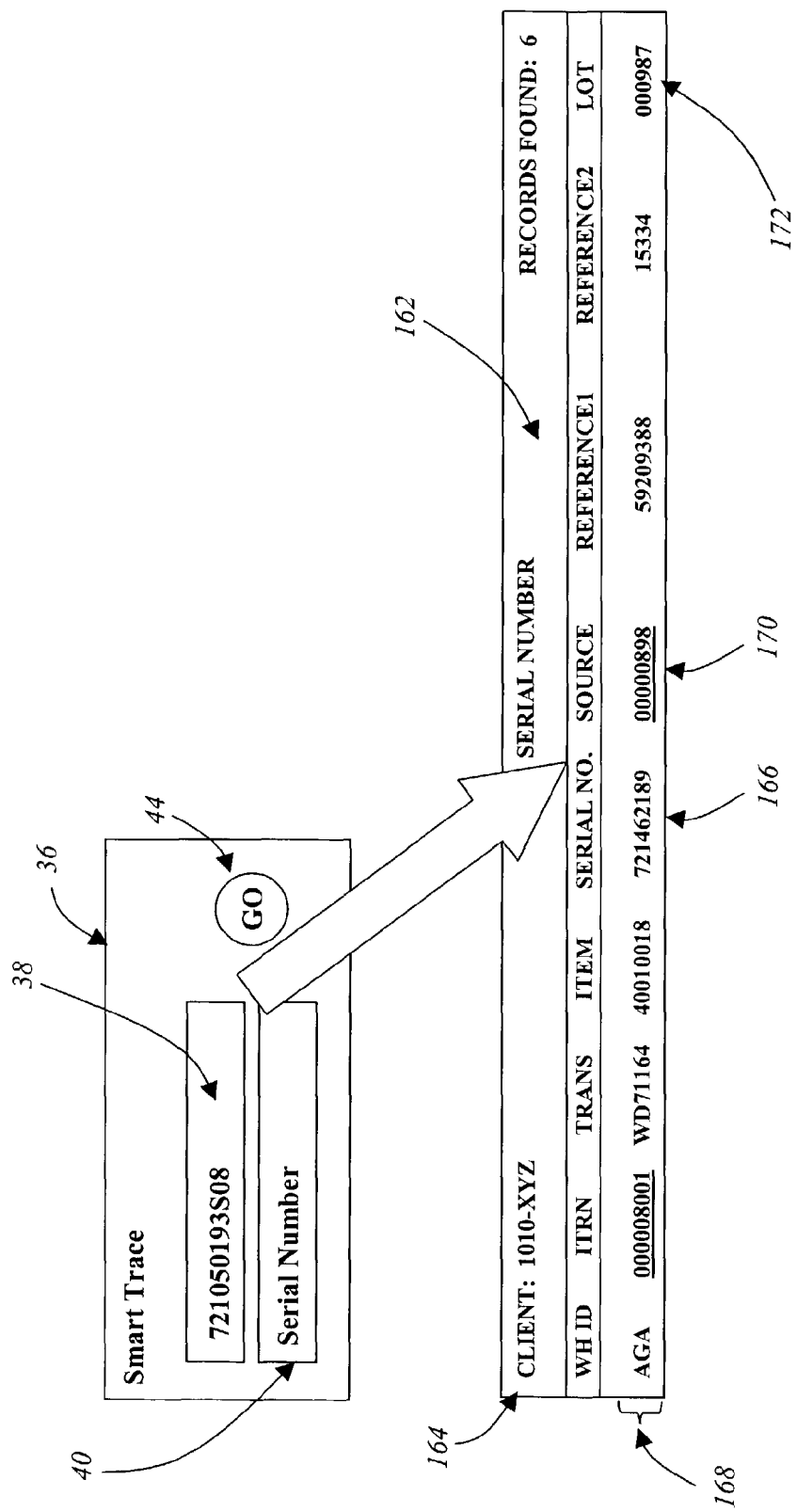
FIG. 14 is a representation of a further embodiment of a GUI, illustrating a Smart Trace search based on a Serial Number category.

In an alternative embodiment, a "Serial Number" search category is also available for Smart Trace searches. Referring to FIG. 14, the user enters an entire Serial Number (or, optionally, a partial Serial Number) in the text field 38 of the Smart Trace window 36, chooses the Serial Number search category in the selection pull-down 40, and clicks the "Go" button 44. A "Serial Number" window 162 appears with the result listed in a records table 168. Each individual record 172 comprises such fields as a warehouse ID, an ITRN number, a transaction type code, an item number, a quantity, a serial number, a source number, reference number 1, reference number 2, and a lot number. The resulting records will have a serial number field 166 that matches the serial number entered by the user in the text field 38 of the Smart Trace window 36. The client name, number of records found, and search category appear in the header 164 of the Serial Number window 162. A Source link 170 is provided to allow the user to access detailed source information.

The search for a set of identification numbers that includes a partial identification number entered by the user may be carried out using a variety of methods. The most desirable method depends on a variety of factors, including the number of records to be searched, the processing speed of the system being utilized, and the available software being utilized by the system. For example, in systems having less than ten-thousand records, simple, conventional database searches (e.g., searching the entire record set) may be sufficient. In systems having less than two-hundred-and-fifty-thousand records, designed query solutions may be desirable. For example, it may be desirable to copy the record tables and to construct an index of the records.

In embodiments of the system shown in the supplied figures in which a search of five million or more records is needed, a catalog technique of searching for the set of identification numbers that include the partial identification number entered is desirable.

In one embodiment of such a technique, an indexed catalog is built that indexes the to-be-searched data in the roll-up data storage device 22 by indexing and cataloging records according to defined-length patterns.

For example, the cataloging system examines the reference numbers (identification numbers) for the records in the roll-up data storage device 22, and identifies all three-character patterns for each of the reference numbers in the records. For example, if a reference number is "12345," the system will identify three three-character patterns, "123," "234," and "345." If a reference number is "62349," the system will identify three three-character patterns, "623," "234," and "349." The system will then construct a catalog identifying each of the records that contains each of the three-character patterns found. For example, the records associated with reference numbers "12345" and "62349" will both be cataloged under the "234" pattern, and the "12345" record will also be cataloged under the "123" and "345" patterns, and the "62349" record will also be cataloged under the "623" and "349" patterns.

In a system in which such a cataloging system is employed, when the user queries the database as described herein, the server examines the partial identification number input by the user and divides the partial number into three-character segments. For example, if a partial number of "1234" is entered, two three-character segments are identified, "123" and "234." Then, the system accesses the catalog previously constructed as above, and determines which of the two three-character segments identified from the query has the smallest number of records associated with that segment. For example, if "123" has 2 million records associated with it, and "234" has five-hundred thousand records associated with it, then the system will select "234" as the group of records to be searched using the user query.

In this manner, a set of records smaller than all records is identified for searching. The system then uses the partial number input by the user to query the records associated with "234," as it has the smallest number of records for searching that includes a segment of the user query. The system searches the "234" record set and identifies all identification numbers having the user query "1234." The system then returns and displays a list of those identified numbers to the user, as described above.

In some instances, a segment will have no records associated with the segment. If, for example, "234" has no records associated with it, then the system concludes that no identification number in the records includes a "234" segment and thus there is no full identification number in the records having the partial number queried by the user. The system then informs the user that no records exist having a partial number of "1234."

In a preferred embodiment, after searching the cataloged records as described above, the system searches any un-cataloged records. For example, records may be created that have not yet been cataloged, and the system preferably searches those un-cataloged records for the desired identification numbers, and includes any matches found in the returned list displayed to the user.

In certain embodiments, the system will search the record set associated with the two segments having the two smallest number of associated records. The selection of such a step, the length of the segments, and other aspects of this method depends upon the length of the identification numbers used in the system, the size of the system, and other factors.

It is important to note that, in light of the object-oriented design of the various embodiments of the present invention, additional searchable categories may be added or current searchable categories may be removed.

It should also be noted that the present invention may be embodied as computer-readable code on computer-readable medium. The computer-readable medium may be any data storage device that can store data, which can thereafter be read by a computer system. Examples of computer-readable medium include, but are not limited to, random-access memory, read-only memory, CD-ROMs, magnetic tape, optical storage devices, and DVD discs. The computer-readable medium may also be distributed over a network via interconnected computer systems, so that the computer-readable code is stored and executed in a distributed fashion.

Various embodiments of the present invention have been described in fulfillment of the various objects of the invention. It should be recognized that these embodiments are merely illustrative of the principles of the various embodiments of the present invention. Modifications to and adaptations thereof will be apparent to those of ordinary skill in the art without departing from the spirit or scope of the present invention.

What is claimed is:

1. A method for tracking a product or service within the product or service's life cycle within a supply chain, the method comprising the steps of:
 receiving, by a processor programmed to receive data associated with the product or service from a client database, a warehouse database, and a carrier tracking database, wherein the data comprises a plurality of records, each of the plurality of records associated with a corresponding first identification number;

consolidating the data into a consolidated data table, wherein consolidating the data comprises creating an indexed catalog containing for each record a plurality of multi-character segments reflecting a portion of the first identification number;

receiving a second identification number associated with the product or service within the supply chain;

receiving, by a processor programmed to receive a searchable category associated with the second identification number;

dividing, by a processor programmed to divide the second identification number into a plurality of multi-character segments reflecting a portion of the second identification number;

searching the consolidated data table for data associated with the searchable category and the second identification number, wherein searching the consolidated data table comprises searching the indexed catalog using the plurality of multi-character segments associated with the second identification number; and outputting the data associated with the searchable category and the second identification number.

2. The method of claim 1, wherein the second identification number comprises a partial identification number.

3. The method of claim 1, wherein the searchable category comprises a searchable category selected from the group consisting of: Item Availability, Company OrderNumber, Warehouse Order Number, Client Reference Number, Carrier Tracking Number, Carrier Tracking Status, Customer Orders, and Item Orders.

4. The method of claim 1, wherein receiving data associated with the product or service from the client database, the warehouse database, and the carrier tracking database comprises receiving the data from a plurality of sources.

5. The method of claim 1, further comprising storing the data in a roll-up data storage device.

6. The method of claim 5, further comprising storing the consolidated data table in the roll-up data storage device.

7. The method of claim 1, wherein searching the consolidated data table comprises searching the consolidated data table using a fuzzy logic technique.

8. The method of claim 1, wherein searching the consolidated data table comprises searching the consolidated data table using a pattern matching technique.

9. The method of claim 1, wherein searching the consolidated data table comprises searching the consolidated data table using an exact matching technique.

10. A system for tracking a product or service within the product or service's life cycle within a supply chain, the system comprising:

a server operable for receiving an identification number and a searchable category;

a roll-up data storage device operable for receiving data associated with the product or service from a client database, a warehouse database, and a carrier tracking database and consolidating the data into a consolidated data table, wherein the data comprises a plurality of records, each of the plurality of records associated with a corresponding first identification number and, wherein consolidating the data comprises creating an indexed catalog containing for each record a plurality of multi-character segments reflecting a portion of the first identification number, the roll-up data storage device further operable to receive a second identification number associated with the product or service within the supply chain;

means for dividing the second identification number into a plurality of multi character segments reflecting a portion of the second identification number; and means for searching the consolidated data table for data associated with the searchable category and the second identification number associated with the category, wherein searching the consolidated data table comprises searching the indexed catalog using the plurality of multi-character segments associated with the second identification number.

11. The system of claim 10, wherein the second identification number comprises a partial identification number.

12. The system of claim 10, wherein the searchable category comprises a searchable category selected from the group consisting of: Item Availability, Company Order Number, Warehouse Order Number, Client Reference Number, Carrier Tracking Number, Carrier Tracking Status, Customer Orders, and Item Orders.

13. The system of claim 10, wherein the roll-up data storage device is operable for receiving the data from one or more remote databases.

14. The system of claim 10, further comprising means for storing the data associated with the product or service.

15. The system of claim 10, further comprising means for storing the consolidated data table.

16. The system of claim 10, wherein the means for searching the consolidated data table comprises fuzzy logic means for searching the consolidated data table.

17. The system of claim 10, wherein the means for searching the consolidated data table comprises pattern matching means for searching the consolidated data table.

18. The system of claim 10, wherein the means for searching the consolidated data table comprises exact matching means for searching the consolidated data table.

* * * * *